(12) United States Patent
Gan et al.

(10) Patent No.: US 11,866,265 B2
(45) Date of Patent: Jan. 9, 2024

(54) TRANSPORT SYSTEM AND TRANSPORT METHOD

(71) Applicant: HOMAG GmbH, Schopfloch (DE)

(72) Inventors: Yimin Gan, Rottenburg am Neckar (DE); Rolf Hofbauer, Gäufelden (DE); Jochen Beck, Horb (DE); Michael Thumm, Neustetten (DE); Ludwig Albrecht, Dornstetten-Aach (DE)

(73) Assignee: HOMAG GMBH, Schopfloch (DE)

(*) Notice: Subject to any disclaimer, the term of this patent is extended or adjusted under 35 U.S.C. 154(b) by 0 days.

(21) Appl. No.: 17/608,965

(22) PCT Filed: May 14, 2020

(86) PCT No.: PCT/EP2020/063458
§ 371 (c)(1),
(2) Date: Nov. 4, 2021

(87) PCT Pub. No.: WO2020/229598
PCT Pub. Date: Nov. 19, 2020

(65) Prior Publication Data
US 2022/0212877 A1 Jul. 7, 2022

(30) Foreign Application Priority Data
May 16, 2019 (DE) ............ 10 2019 112 868.4

(51) Int. Cl.
B65G 23/44 (2006.01)
B65G 43/00 (2006.01)
B65G 43/02 (2006.01)

(52) U.S. Cl.
CPC ............ B65G 23/44 (2013.01); B65G 43/00 (2013.01); B65G 43/02 (2013.01); B65G 2203/0266 (2013.01)

(58) Field of Classification Search
CPC ........ B65G 23/44; B65G 43/00; B65G 43/02; B65G 2203/0266
(Continued)

(56) References Cited

U.S. PATENT DOCUMENTS 5,641,058 A * 6/1997 Merten ................ B65G 23/44
198/810.04
5,647,640 A * 7/1997 Heintzmann ........... E21C 27/34
198/810.04

(Continued)

FOREIGN PATENT DOCUMENTS

CN 101948045 1/2011
DE 3131963 A1 2/1983
(Continued)

OTHER PUBLICATIONS

Hu et al., "Simultaneous Measurement of Belt speed and Vibration Through Electrostatic Sensing and Data Fusion," IEEE Transactions on Instrumentation and Measurement, May 2016, vol. 65, No. 5, pp. 1130-1138.
(Continued)

Primary Examiner — James R Bidwell
(74) Attorney, Agent, or Firm — Morgan, Lewis & Bockius LLP

(57) ABSTRACT

A transport system (1) for transporting workpieces (2) which preferably consist at least in sections of wood, wood-based materials, plastic or the like, comprising at least one circulating transport means (15); a guide arrangement (4) for guiding the at least one circulating transport means (15); at least one sensor (10, 11, 12) for detecting at least one condition variable, in particular the preload force and/or instantaneous load on the at least one circulating transport means (15) and/or the dynamic behavior of at least one section (6, 8) of the transport system (1); and at least one (Continued)

actuator (13, 20) for influencing at least one condition variable of the transport system (1).

15 Claims, 3 Drawing Sheets

(58) Field of Classification Search
USPC .............................................. 198/813, 810.04
See application file for complete search history.

(56) References Cited

U.S. PATENT DOCUMENTS

| | | | | |
|---|---|---|---|---|
| 7,117,989 | B2* | 10/2006 | Weigel | B65G 23/44 |
| | | | | 198/810.04 |
| 7,353,937 | B2* | 4/2008 | Ziegler | B65G 43/02 |
| | | | | 198/810.04 |
| 9,522,789 | B1 | 12/2016 | Rimmington | |
| 9,809,389 | B2 | 11/2017 | Pauli et al. | |
| 2014/0336812 | A1 | 11/2014 | Rathmann et al. | |
| 2016/0325940 | A1* | 11/2016 | Rimmington | B65G 43/00 |
| 2016/0356159 | A1* | 12/2016 | Worthington | E21F 13/06 |
| 2017/0183166 | A1* | 6/2017 | von Pohle | B65G 39/16 |
| 2017/0183168 | A1 | 6/2017 | Jia | |
| 2017/0297825 | A1 | 10/2017 | Watson et al. | |
| 2019/0009989 | A1 | 1/2019 | Francisco | |

FOREIGN PATENT DOCUMENTS

| | | |
|---|---|---|
| DE | 19619364 A1 | 11/1997 |
| DE | 10326133 A1 | 1/2005 |
| EP | 2377786 A1 | 10/2011 |
| GB | 2493102 | 1/2013 |
| JP | 2013-166599 | 8/2013 |
| WO | WO 2018/169603 | 9/2018 |

OTHER PUBLICATIONS

Dry Cargo International, "Conveyors—getting carried away in the bulk industry," Apr. 2011, retrieved from https://www.drycargomag.com/conveyors-getting-carried-away-in-the-bulk-industry.

* cited by examiner

TRANSPORT SYSTEM AND TRANSPORT METHOD

TECHNICAL FIELD

The invention relates to a transport system and a transport method.

PRIOR ART

Machining devices can be designed to carry out a variety of machining operations, such as cutting or separating operations, on continuously fed workpieces. For this purpose, the workpieces to be machined can be transported through the machining region of a machining device using one or more transport means. Machining devices in which the workpieces continuously pass through one or more machining regions are also referred to as through-feed machines.

A transport system which can be used to transport the workpieces to be machined through the machining region of a through-feed machine is disclosed in EP 2377786 A1, for example.

For the purpose of transporting workpieces, a transport system may comprise transport structures which are in direct contact with the workpiece to be machined during the transport thereof, such as chains, belts or other circulating transport means. The connection between the (circulating) transport means and the workpiece, which is necessary for transporting the workpieces, may for example be established by the static friction, resulting from the force of gravity, between the workpiece and the transport structure or by driver elements. Top pressure belts may additionally be used. Inside a machining device such a transport system is usually arranged in a transport means housing.

The functionality, reliability and service life of a transport system with circulating transport means depends on several factors, such as the appropriate preload, the positional accuracy of the gearing and the degree of wear of the circulating transport means. These parameters change during operation on account of mechanical and thermal stress. This can result in reduced precision of the conveying operation, which in machining devices can be reflected in reduced machining quality and machining accuracy.

It is also known that transport systems require maintenance after a certain period of time in order to readjust or amend the parameters that have changed depending on the degree of wear. Without timely maintenance and adjustments, the transport system may exhibit premature wear or may even break down. This can cause significant economic damage. One known solution is to carry out maintenance in a short maintenance cycle such as every two weeks. However, this preventative measure has economic disadvantages owing to the reduced availability of devices.

DESCRIPTION OF THE INVENTION

The object of the invention is to provide a transport system and a transport method which have a precise conveying operation, a high degree of reliability, a long service life and low maintenance requirements.

According to the invention, this object is achieved by the transport system and by the transport method disclosed herein. Preferred embodiments are set out in the subclaims.

The invention is based on the concept of identifying the causes of the aforementioned problems early on and actively influencing the system to eliminate or mitigate them. To this end, the transport system according to the invention comprises at least one sensor for detecting at least one condition variable, in particular the preload force and/or instantaneous load on the at least one circulating transport means and/or the dynamic behavior of at least one section of the transport system, and at least one actuator for influencing at least one condition variable of the transport system.

The provision of at least one sensor for detecting at least one condition variable allows the conveying operation of the transport system according to the invention to be continuously monitored, so that any problems, and optionally also the causes thereof, can be identified early on. Based on this, the system can be actively influenced in order to eliminate or at least mitigate the problems and, where possible, also the causes thereof.

Moreover, based on this a more precise and reproducible adjustment of the preload force of the chain is facilitated, in particular in combination with the at least one actuator.

Vibration and noise emissions can be minimized by virtue of the optimized preload forces of the chain. Furthermore, the transport system offers improved process reliability as a result of detecting incorrect process parameters. Moreover, by detecting component defects early on, a reduction in maintenance costs and a considerable improvement in service life and availability of devices can be achieved. In addition, wear and special events such as short-term force and voltage peaks can also be detected by the at least one sensor, and the transport system can in this case be stopped automatically. Preventative maintenance based on measurement data and statistical models can also be facilitated. Finally, in this way the service life of the tool and the machining quality and machining accuracy of a workpiece to be machined are improved with machining devices equipped with a transport system as according to the invention.

This applies also and in particular if the transport system comprises a plurality of circulating transport means such as in the case of so-called double-sided devices. Thanks to the invention, a particularly synchronous operation of the circulating transport means can be achieved, and therefore the aforementioned advantages can be achieved in a particularly pronounced manner.

According to a development of the invention, provision is made for the guide arrangement to comprise at least two sections, wherein preferably at least one actuator is provided between a first section and a second section of the guide arrangement. This opens up particularly diverse and effective ways of influencing the dynamic and other properties of the transport system by means of at least one actuator, such that the aforementioned advantages can be achieved particularly easily and effectively.

The transport system according to the invention may comprise a plurality of sensors. However, it is particularly preferable for the transport system to have at least one first sensor for detecting a condition variable which is preferably selected from preload force, instantaneous load, strain, displacement, velocity and acceleration of the at least one circulating transport means. This allows the condition and the current properties of the at least one transport means to be detected immediately, such that precise conclusions can be drawn and, where necessary, appropriate measures can be taken on the basis thereof. As a result, this gives rise once again to a transport system according to the invention having a precise conveying operation, a high degree of reliability, a long service life and low maintenance requirements.

Furthermore, according to a development of the invention provision is made for the transport system to have at least one second sensor for detecting the dynamic behavior of at least one section of the transport system, in particular the circulating transport means and/or the guide arrangement. In this way, particularly the dynamic behavior and also the dynamic reliability and durability of the transport system according to the invention can be optimized. It is particularly preferred for at least one sensor to be arranged on at least one circulating transport means in order to detect the vibration behavior of the circulating transport means as soon as possible and in an undistorted manner. Alternatively or additionally thereto, according to a development of the invention it may also be advantageous, however, for at least one sensor to be arranged on the guide arrangement. In this way, it can be determined whether, for example, the cause of the vibrations potentially lies in the region of the guide arrangement or whether and to what extent the guide arrangement influences the vibrations of the circulating transport means. As is also the case with the previous aspects of the invention, on this basis appropriate optimization measures can be taken, such as, for example, an adjustment of the system using the at least one actuator, or other adjustment or maintenance measures.

A wide variety of components or devices can be considered as actuators within the scope of the present invention. However, it is particularly preferred that at least one actuator comprises an actuating element which is capable of controlling or adjusting at least one condition variable of the transport system (1) by the application of force or by way of positional adjustment and which is preferably selected from a pneumatic actuator, a hydraulic actuator, an electromagnetic actuator, a piezo actuator, a threaded spindle, a servomotor and a linear motor. Using an actuating element as an "active" actuator allows in particular the dynamic properties of the transport system to be optimized in a particularly effective manner, wherein the data detected by the at least one sensor can be used again here. In this way, an active transport system is obtained which can adjust its properties to a wide variety of influencing variables and parameters such as the conveying speed, conveying load, temperature, state of wear, degree of soiling etc.

Alternatively or additionally thereto, according to a development of the invention provision is made for at least one actuator to comprise an adjustable damping element, the damping properties of which are variable, in particular controllable or adjustable. This also allows the dynamic properties of the transport system according to the invention to be adjusted in a targeted manner to the respective requirements or to the respective operating parameters. In this regard, the at least one adjustable damping element fulfills a dual function, in that it continuously facilitates vibration damping of the transport system, yet this damping behavior can be actively adjusted in a controlled manner, such that overall the result is an optimal behavior of the transport system that can continuously be adjusted to requirements and operating parameters.

With regard to the control or adjustment of the at least one actuator, according to a development of the invention provision is made for the transport system to comprise a control module which is configured to control, preferably adjust, the at least one actuator and/or at least one driving means for driving the circulating transport means depending on a detection result of at least one sensor. In this way the invention provides an active transport system, as already mentioned above, which can adjust quickly and effectively to the respective requirements and operating parameters. This contributes significantly to achieving the underlying object, namely to providing a transport system having a precise conveying operation, a high degree of reliability, a long service life and low maintenance requirements.

Within the scope of the invention it is possible, in principle, to use the at least one actuator to influence at least one condition variable of the transport system only at longer intervals, for example when switching operating modes. However, according to a development of the invention provision is made for the control module to be configured to control or adjust the at least one actuator at least occasionally at a frequency of at least 1 Hz. This allows the concept of an active transport system to be implemented particularly consistently, and there are no time periods in which vibrations can increase, damage can proliferate or machining inaccuracies can add up. Once again, this contributes to achieving the underlying object set out above. It is particularly preferable to take as a basis a frequency of at least 10 Hz, particularly preferably at least 30 Hz, for the control or adjustment. This nips possible vibrations or other undesirable effects in the bud, so that a whole new dimension of a precise, stable and low-maintenance transport process is achieved.

To achieve the aforementioned advantages, according to a development of the invention provision is made for the at least one actuator to be controlled not only in a resting state of the transport system but rather for the control module to be configured to control or adjust the at least one actuator during a transport movement of the at least one circulating transport means. It is therefore not necessary to stop the device for the purpose of controlling the at least one actuator. Rather, according to this development it is possible to always respond in a flexible manner to the respective operating parameters even during the conveying operation of a certain workpiece. Thus, the at least one actuating element can, for example, be controlled as soon as a workpiece conveyed on the transport system engages with a machining assembly, such that even vibrations and forces exerted on a workpiece and therefore on the transport system by a machining assembly can be balanced out by the transport system according to the invention. In retrospect, it is obvious that a drastic improvement of machining accuracy and machining quality can be achieved in this way, while at the same time damage to the transport system and also to any machining assemblies present is avoided.

Even though the transport system according to the invention may also be a passive transport system in which the items to be transported are advanced in a different way, according to a development of the invention provision is made for the transport system to comprise driving means for driving the circulating transport means. In this way, the transporting operation of the transport system can be influenced to an even greater degree, for example by the driving means being controlled or adjusted on the basis of a detection result of the at least one sensor.

In the context of the present invention, the circulating transport means can be designed in a variety of ways. However, according to a development of the invention provision is made for the circulating transport means to comprise articulate transport means such as, in particular, a transporting chain and/or a belt. Such circulating transport means have proven successful in practice. At the same time, the advantages of the invention can be realized particularly effectively with such circulating transport means. Particularly in the case of articulate transport means, the so-called polygon effect can be compensated for by the invention, such that as a result a robust and precise transport system having a high degree of reliability and a long service life as well as low maintenance requirements can be provided with simple means. Similar considerations apply to belts with which a polygon effect can also occur depending on the design thereof, and with which dynamic peculiarities can occur depending on the longitudinal rigidity thereof, which can be advantageously compensated for by the transport system according to the invention.

According to a development of the invention, provision is also made for the transport system to comprise an interface which communicates with the control module and which is designed to send at least one condition variable of the transport system to a database and/or to receive data from a database in order to relay this to the control module. In this way, not only is a general networking of the transport system with other production units possible but also completely new possibilities for optimizing the operating parameters and for maintaining and repairing the transport system are opened up. Operating parameters of different transport systems can be combined and compared via the interface and database in order to identify optimal settings on the basis thereof, for example for the at least one actuator. Furthermore, this also opens up the possibility of targeted condition monitoring which allows maintenance and repair work to be planned and implemented in a much more targeted manner and therefore with less of an adverse impact on the production operation ("predictive maintenance"). In particular, potential maintenance and repair requirements can be identified early on. In this way, based on the data from the at least one sensor, conclusions can be drawn as to the state of wear of certain components, such that where necessary the ordering of replacement parts can be initiated in good time and a date for maintenance or repairs can be scheduled into the production process. This results in a drastic increase in device availability and, not least, reduces the risk of fatal accidents in the transport system.

In the context of the invention, the database may be provided locally and may be networked with a transport system, for example, or optionally with a plurality of devices. However, according to a development of the invention provision is made for the interface to be configured to communicate with the database via the interne or another remote data transmission link. As a result, the advantages set out above can be achieved in a particularly comprehensive manner. In particular, it is also possible to use the database connection for communicating between the operator of the transport system, the maintenance company of the transport system, the manufacturing company of the transport system and other parties where appropriate.

Moreover, according to a development of the invention provision is made for the transport system to comprise a display device which is designed to visualize data, in particular from the at least one sensor and/or actuating element. The data may be raw data and/or processed data. In this way, an operator is always kept informed of the current condition of the transport system ("condition monitoring") and can take necessary measures where required.

A transport method according to the invention using the transport system according to the invention is disclosed herein. This is characterized in that the detection of at least one condition variable takes place during the actual transporting process. It is therefore not necessary to stop the device or to carry out a special calibration operation. Furthermore, the method allows direct feedback, i.e. controlling or adjusting is carried out continuously during the transporting operation, which facilitates the advantages set out above.

BRIEF DESCRIPTION OF THE DRAWINGS

Preferred embodiments of the present invention as well as further embodiments and advantages are revealed in the description of the drawings below.

DETAILED DESCRIPTION OF PREFERRED EMBODIMENTS

In the following, preferred embodiments of the invention will be described in detail with reference to the accompanying drawings.

Figure 1:
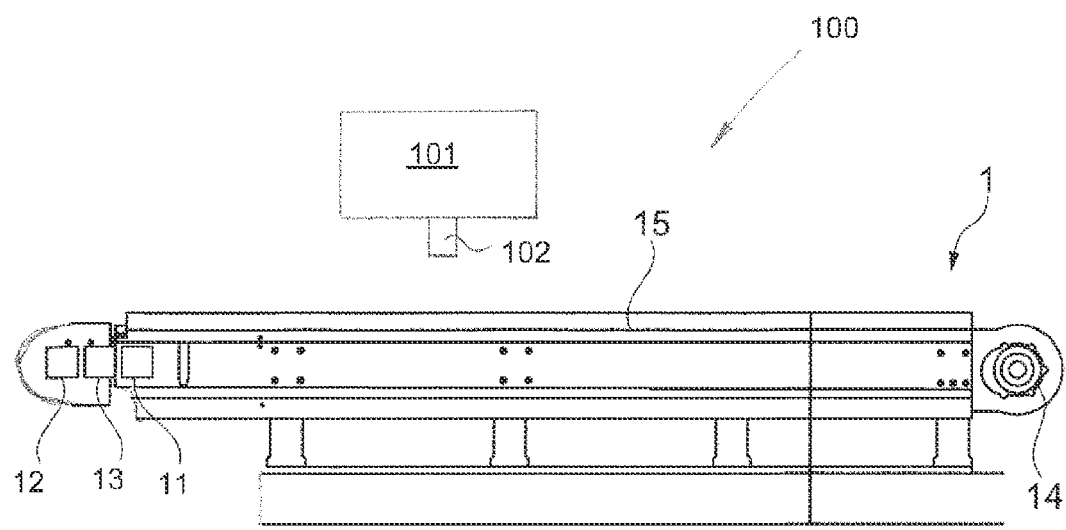
FIG. 1 schematically shows a side view of one embodiment of the transport system according to the invention.

A side view of a transport system 1 as one embodiment of the invention is schematically shown in FIG. 1. In this embodiment, the transport system 1 is part of a machining device 100 which is used to machine workpieces 2. The workpieces may, for example, consist at least in sections of wood, wood-based materials, plastic or the like, as are widely used in the field of the furniture and components industry. For machining these workpieces, the machining device 100 has a machining unit 101 with a machining tool 102. It should be noted, however, that several other embodiments of the machining device 100 are possible. Furthermore, it should be noted that the transport device 1 can also be used as a stand-alone machine, or that the transport system 1 can also be combined with completely different devices.

Figure 2:
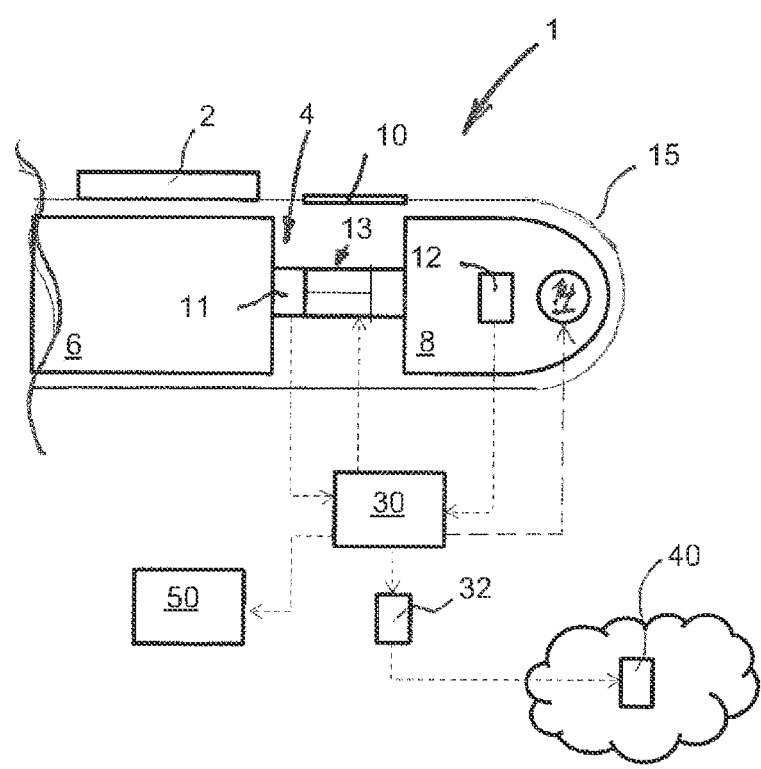
FIG. 2 schematically shows a partial side view of one embodiment of the transport system according to the invention.

The transport system 1 has a circulating transport means 15 which in the present embodiment is formed by a transport chain. Alternatively or additionally thereto, however, other circulating transport means such as belts or the like can also be used. The circulating transport means 15 is guided by a guide arrangement 4 and is deflected at the two free ends of the guiding means 4 by suitable wheels (not shown). In the present embodiment, the guide arrangement is formed of a plurality of parts. As can be seen in FIG. 2, for example, the guide arrangement may comprise a first section 6 and a second section 8.

Furthermore, in the present embodiment the transport system has a plurality of sensors 10, 11 and 12, which are used to detect various condition variables of the transport system. For instance, a first sensor 11 is arranged on the first section 6 of the guiding means 4 and is used to detect a preload force or instantaneous load on the circulating transport means 15. A second sensor 12 is arranged on the second section 8 of the guide arrangement and is used to detect the vibration behavior or dynamic behavior of the second section 8 of the guide arrangement as well as indirectly also of the circulating transport means 15. A further sensor 10 is provided directly on or in the circulating transport means 15 and thus directly detects the vibration behavior of the circulating transport means 15. In the region of a deflection wheel, the transport system comprises a drive 14 for driving the circulating transport means 15.

Moreover, the transport system 1 has an actuating element 13 which in the present embodiment is arranged between the first section 6 and the second section 8 of the guide arrangement, wherein, as shown in FIG. 2, the first sensor 11 is still inserted between the actuating element 13 and the first section 6 of the guide arrangement 4.

The actuating element 13 is used to influence one or more condition variable(s) of the transport system, for example by changing the clearance between the first section 6 and the second section 8 of the guide arrangement 4 and thus directly impacting the preload force or instantaneous load on the circulating transport means 15. In this way, however, not only can the tension of the circulating transport means be changed but also vibrations of the circulating transport means 15 can be directly absorbed or mitigated. To this end, in the present embodiment the actuator 13 is designed as an actuating element, wherein this may be, for example, a pneumatic actuator, a hydraulic actuator, a piezo actuator, a threaded spindle, a servomotor or a linear motor. Combinations of these actuators and other actuators are of course also possible.

As can best be seen in FIG. 2, the transport system 1 also comprises a control module such as a controller 30, which obtains the data detected by the sensors 10, 11 and 12 as input data and on the basis thereof controls or adjusts the (at least one) actuator 13 and also, where appropriate, the drive 14. "Controls" or "adjusts" is to be understood such that in the simplest case a control can be meant; preferably, however, an adjustment.

In the present embodiment, the controller 30 operates at a frequency of 10 Hz, although other frequencies are also possible, for example in the range of at least 1 Hz to 100 Hz or more. At this frequency the controller 30 controls or adjusts at least one actuator 13 on the basis of the data detected by the sensors 10, 11 and 12. The objective here may be to minimize vibrations occurring in the circulating transport means 15. Depending on the application, however, there may also be additional aims, such as, for example, minimizing wear, minimizing noise emissions, maximizing operational reliability etc., wherein it is often the case that several objectives can be pursued or assessed at the same time.

The adjustment operation of the controller 30 can, in principle, take place at any time, wherein the controller 30 is configured in the present embodiment to control or adjust the at least one actuator during a transport movement of the at least one circulating transport means 15.

FIG. 2 also shows a display device 50, which is used to visualize different data including that of the sensors 10, 11 and 12 and that of the actuating element 13. The display device 50 may also be used to operate the device or it may have other functionalities.

Furthermore, as shown in FIG. 2, the transport system 1 comprises a data interface 32 which communicates with the controller 30 and which is used to send one or more condition variables of the transport system 1 to a database 40 and/or to receive data from the database 40 in order to relay this in turn to the controller 30. In the present embodiment, the database 40 is stored "in the cloud", i.e. the interface 32 communicates with the database 40 via the internet or another suitable remote data transmission link.

The connection of the controller 30 to a database facilitates on the one hand the targeted data collection and networking of whole production systems or even independent devices at a wide variety of locations. At the same time, however, this networking also allows a comparison of the current condition variables of the transport system with certain target parameters, in order to draw conclusions as to maintenance and repair requirements, for example, on the basis thereof. Thus, on this basis a prediction concept for maintenance and repairs ("predictive maintenance") can be realized, with which emerging maintenance and repair requirements can be identified in good time and thus appropriate measures can also be taken in a timely manner, such as ordering replacement parts, scheduling maintenance and repair works etc. Moreover, the condition variables of different transport systems can also be compared with one another and optimized operating parameters for identical or similar transport systems can be derived on the basis thereof, which results, for example, in minimized wear or in minimized vibrations. Such compared data can then be fed back to the controller 30 as control or adjustment data in order to further optimize the operation of the transport system 1.

Figure 3:
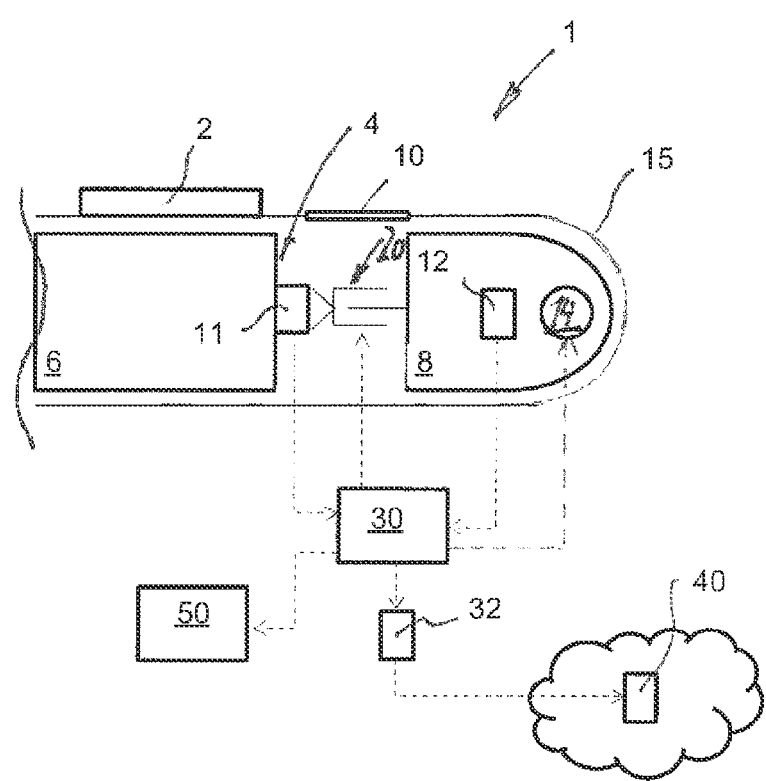
FIG. 3 schematically shows a partial side view of one embodiment of the transport system according to the invention.

An alternative embodiment of the transport system 1 according to the invention is schematically shown in FIG. 3. This differs from the embodiment shown in FIG. 2 primarily in that instead of the actuating element 13 a variable (controllable or adjustable) damping element 20 is provided between the first section 6 and the second section 8 of the guiding means 4. Thus, a less active actuator is used, which is focused less on adjusting the distance between the first section 6 and the second section 8 of the guiding means; rather, it provides for a spring-loaded mounting of the second section 8 in relation to the first section 6. This also allows any vibrations of the circulating transport means 15 to be effectively minimized. In this respect it should be noted that combinations of both concepts are also possible, for example by providing both an actuating element and an adjustable damping element between the first section 6 and the second section 8 of the guide arrangement 4, wherein these can then be arranged one behind the other in series, for example.

REFERENCE NUMBERS

1 Transport system
2 Workpiece
6 First section of the guide arrangement
8 Second section of the guide arrangement
10 Circulating sensor
11 First sensor
12 Second sensor
13 Actuating element
14 Driving means
15 Circulating transport means
20 Damper
30 Control module
32 Interface
40 Database
50 Display device

The invention claimed is:

1. A transport system for transporting workpieces comprising:
at least one circulating transport means;
a guide arrangement for guiding the at least one circulating transport means;
at least one sensor for detecting at least one condition variable, in particular the preload force and/or instantaneous load on the at least one circulating transport means and the dynamic behavior of at least one section of the transport system;
at least one actuator for influencing at least one condition variable of the transport system, the at least one actuator comprising an adjustable damping element, the damping properties of which are adjustable;
a control module configured to control the at least one actuator; and
an interface that communicates with the control module and that is designed to send at least one condition variable of the transport system to a database or to receive data from a database in order to relay this to the control module, the interface being configured to communicate with the database via the internet or another remote data transmission link.

2. The transport system according to claim 1, wherein the guide arrangement comprises at least two sections, wherein at least one actuator is provided between a first section and a second section of the guide arrangement.

3. The transport system according to claim 1, wherein the transport system has at least one first sensor for detecting a condition variable which is selected from preload force, instantaneous load, strain, displacement, velocity and acceleration of the at least one circulating transport means.

4. The transport system according to claim 1, wherein the transport system has at least one second sensor for detecting the dynamic behavior of at least one section of the transport system.

5. The transport system according to claim 1, wherein at least one sensor is arranged on at least one circulating transport means, and at least one sensor is arranged on the guide arrangement.

6. The transport system according to claim 1, wherein at least one actuator comprises an actuating element which is capable of controlling or adjusting at least one condition variable of the transport system by the application of force or by way of positional adjustment and which is selected from a pneumatic actuator, a hydraulic actuator, an electromagnetic actuator, a piezo actuator, a threaded spindle, a servomotor and a linear motor.

7. The transport system according to claim 1, wherein the damping properties comprise rebound.

8. The transport system according to claim 1, wherein the transport system comprises a control module which is configured to control, the at least one actuator and at least one driving means for driving the circulating transport means depending on a detection result of at least one sensor.

9. The transport system according to claim 8, wherein the control module is configured to control or adjust the at least one actuator at least occasionally at a frequency of at least 1 Hz.

10. The transport system according to claim 8, wherein the control module is configured to control or adjust the at least one actuator during a transport movement of the at least one circulating transport means.

11. The transport system according to claim 1, further comprising: a driving means for driving the circulating transport means.

12. The transport system according to claim 1, wherein the circulating transport means comprises articulate transport means.

13. The transport system according to claim 1, further comprising:
    a display device which is designed to visualize data, from the at least one sensor and/or actuating element.

14. A transport method for transporting a workpiece using at least one circulating transport means of a transport system according to claim 1, wherein
    during the transport at least one condition variable is detected, and
    based on the detected data at least one actuator is controlled and/or adjusted.

15. The transport system according to claim 1, wherein the damping properties comprise compression damping.

* * * * *